United States Patent [19]

Morimoto

[11] Patent Number: 5,198,732
[45] Date of Patent: Mar. 30, 1993

[54] ROTATION CONTROL SYSTEM FOR ULTRASONIC MOTOR

[75] Inventor: Seiichi Morimoto, Kobe, Japan

[73] Assignee: Mitsubishi Jukogyo Kabushiki Kaisha, Tokyo, Japan

[21] Appl. No.: 750,453

[22] Filed: Aug. 27, 1991

[51] Int. Cl.$^5$ .............................................. H01L 41/08
[52] U.S. Cl. ...................................... 318/116; 310/316
[58] Field of Search ................ 310/316, 317; 318/116, 318/118

[56] References Cited

U.S. PATENT DOCUMENTS

| 4,562,374 | 12/1985 | Sashida | 310/323 |
| 4,727,276 | 2/1988 | Izukawa et al. | 310/316 |
| 5,010,222 | 4/1991 | Suganuma | 318/116 |
| 5,013,982 | 5/1991 | Sasaki | 318/116 X |
| 5,023,526 | 6/1991 | Kuwabara et al. | 318/116 |
| 5,099,180 | 3/1992 | Noguchi | 318/116 |

FOREIGN PATENT DOCUMENTS

| 0299771 | 1/1989 | European Pat. Off. |
| 0403298 | 12/1990 | European Pat. Off. |
| 0404023A3 | 12/1990 | European Pat. Off. |
| 59-96881 | 6/1984 | Japan |
| 59-122385 | 7/1984 | Japan |
| 1-17353 | 3/1989 | Japan |

Primary Examiner—Mark O. Budd
Attorney, Agent, or Firm—Jacobson, Price, Holman & Stern

[57] ABSTRACT

A control system for a progressive wave type ultrasonic motor including an ultrasonic motor driver circuit which supplies driving electric power to an ultrasonic motor and a rotary encoder which is coupled with an output shaft of the ultrasonic motor and generates a pulse signal in accordance with rotation of the ultrasonic motor, comprising a reference clock signal generator which generates a clock signal and a phase locked loop circuit which transmits a control signal to an ultrasonic motor driver circuit based on the clock signal and the pulse signal from the rotary encoder, and controlling the speed of the ultrasonic motor; and a control apparatus, comprising a driving control means which transmits a driving signal to an ultrasonic motor driver in accordance with a command pulse instructing to start driving of the ultrasonic motor and transmits a suspension signal to the ultrasonic motor driver in accordance with the pulse signal from the rotary encoder, and driving the ultrasonic motor intermittently. In addition, an automatic frequency stabilizing circuit which may be used by combining with these control apparatus. More stabilized speed control and positioning control of an ultrasonic motor become possible.

4 Claims, 7 Drawing Sheets

FIG. 5(a) REFERENCE CLOCK (CS)
FIG. 5(b) ENCODER PULSE
FIG. 5(c) OUTPUT FROM F/F 28a
FIG. 5(d) OUTPUT FROM F/F 28b
FIG. 5(e) OUTPUT FROM PLL CIRCUIT 7

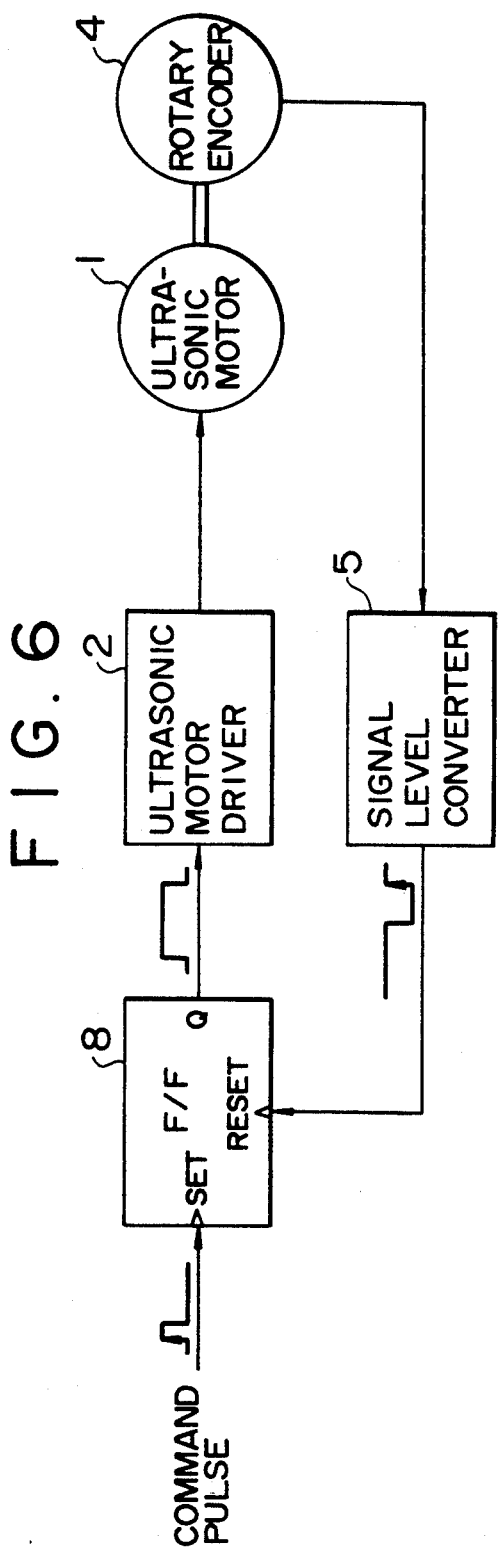
F I G. 6
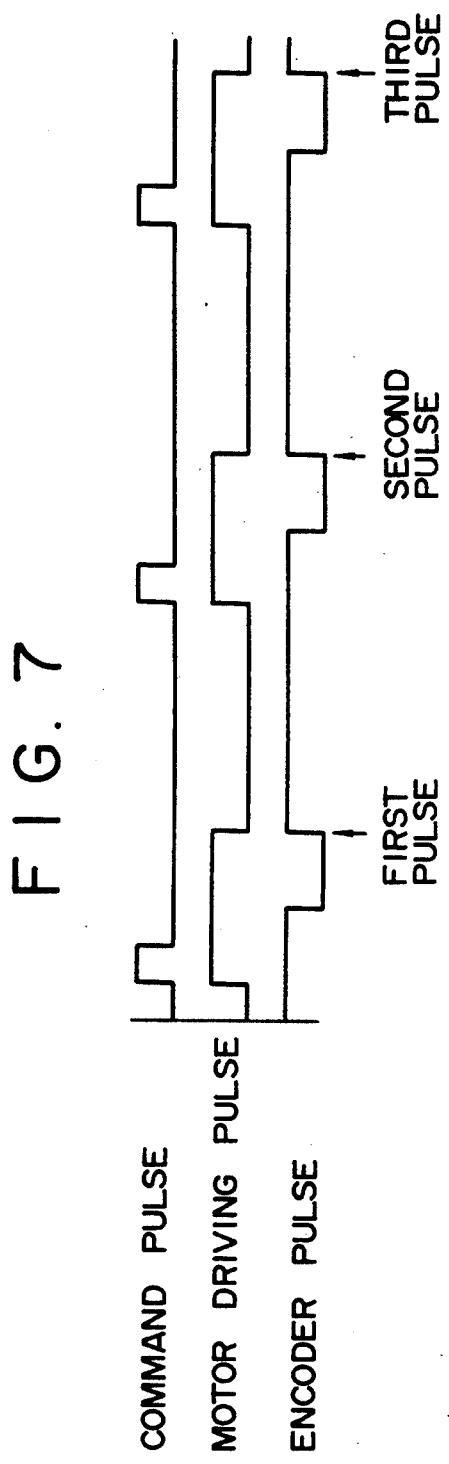
F I G. 7

ROTATION CONTROL SYSTEM FOR ULTRASONIC MOTOR

BACKGROUND OF THE INVENTION

1. Field of the Invention

The present invention relates to a control system for an ultrasonic motor which controls rotation speed and rotational position of an output shaft of an ultrasonic motor.

2. Description of the Related Art

An electric motor utilizing electromagnetic force has been used widely in various industrial fields, and miniaturization thereof has been also carried out. However, since an armature including a winding is required in any type of electric motor, the use is restricted sometimes because of the large size and the like.

An ultrasonic motor compact in size and capable of generating a high torque and having good rotation controllability has been developed recently and already put into practical use (for example, see the specification of U.S. Pat. No. 4,562,374). Putting the driving principle in brief, this new ultrasonic motor, being different from an old type ultrasonic motor using a Langevin type oscillator, utilizes flexing oscillation having a progressive wave of a elastic ring-like member with piezoelectric elements stuck on one surface thereof, and drives by friction force a rotor which is in contact under pressure with the elastic member. In the surface of the elastic ring-like member with which the rotor is in contact, there are produced elliptic motions which rotate in a direction reverse to the propagating direction of the wave. Since the rotor is driven by friction force by means of very small displacement due to such motion, movement of the rotor, viz., rotation thereof, is stopped without delay when above-mentioned movement, viz., flexing vibration of the elastic ring-like member is stopped, thus generating no inertial rotation.

In order to make the displacement by elliptic motion in the surface of above-mentioned elastic ring-like member suitable for actual use, high frequency voltages are applied to piezoelectric elements so as to oscillate at a resonance frequency of a system including the elastic ring-like member or a frequency close thereto.

Since such a progressive wave type ultrasonic motor is small in size and produces a high torque, and further, vary low speed rotation is directly obtainable, it is effectual as a rotation drive means for an optical system of an apparatus performing circumferential welding in a very thin tube such as the laser beam welding apparatus for an inner circumferential surface of a tube disclosed in the specification of U.S. Pat. No. 4,839,495.

In such a circumferential welding apparatus utilizing a laser beam, it is only required to have a laser optical system make a single rotation. In order to perform welding of high quality, however, it is required to always maintain a scanning speed of a laser beam viz., circumferential rotating speed of the laser optical system constant.

In order to drive a progressive wave type ultrasonic motor, high frequency voltages having different phases such as voltages of a sine wave form and a cosine wave are applied to a elastic ring-like member, viz., piezoelectric element of a stator. A voltage of a resonance frequency is applied to an ultrasonic motor driver which generate two-phase alternating voltages. Accordingly, a frequency stabilizing circuit for generating a resonance frequency stably and accurately is desired in order to obtain a stabilized circumferential rotating speed.

In case a signal of a desired frequency is required to be outputted, it has been known in general to get it by dividing output pulses of a crystal oscillator. However, there has been such a problem that, in production of a signal of a high frequency (several hundred KHz for instance), decrease in resolution cannot be avoided and a stabilized frequency is unobtainable.

In another system, a digital frequency set value (a target frequency value) is converted into an analog voltage by means of a digital-analog (D/A) converter, and the analog voltage is converted into the signal of a desired frequency. FIG. 9 shows an example of such a system. In FIG. 9, a digital frequency set value received from a CPU (central processing unit) 40 is converted into an analog voltage by means of a D/A converter 41. This analog voltage is converted into an AC signal having a frequency set by a voltage/frequency (V/F) converter 42.

In a system combining the D/A converter and the V/F converter, however, there are such problems that analog adjustment for having an output frequency coincide with a digital frequency set value is required, and further, the output frequency may be varied depending on changes in temperature and the like. Therefore, conventional frequency output apparatuses have been unable to meet the necessity for a stable and accurate resonance frequency as described above.

As described, in order to obtain a stable circumferential rotating speed in an ultrasonic motor, it is required to apply a voltage of a stabilized frequency to an ultrasonic motor driver. An application of the voltage of a stabilized frequency is, however, insufficient for getting a stable rotating speed. It is required to pick up an actual rotating speed of the rotor of the ultrasonic motor and feed it back to the ultrasonic motor driver.

In order to control the rotating speed of an ultrasonic motor, it has been proposed that an output pulse signal of a rotary encoder coupled with the output shaft of the ultrasonic motor is converted from a frequency signal into a voltage signal (F/V conversion) so as to be fed back, and to apply pulse width modulation to the feed back signal. In such a pulse width modulation (PWM) system, however, the pulse width does not change before the rotation of the motor is decreased or increased. As a result, the rotating speed (same as the circumferential rotating speed) is not completely stabilized when load variation occurs. Further, in case adjustment of a loop gain for feedback is made inappropriately, the speed pulsates or the following-up time takes too long. Thus, a new control system which is capable of controlling the rotating speed of the ultrasonic motor stably has been desired.

Furthermore, accurate positioning is required in controlling the rotation of the ultrasonic motor. As a general method therefor, it has been known that output pulses of a rotary encoder coupled with the output shaft are counted and monitored, and the motor driving input is stopped when the count value reaches a value showing a target position. When such positioning control is made utilizing an electronic computer, there is such a problem that stop operation is delayed by the portion of scan time for monitoring the count of encoder pulses, thus deteriorating positioning accuracy.

SUMMARY OF THE INVENTION

The present invention has been made based on the needs with such problems in the related art as a background.

It is an object of the present invention to provide an ultrasonic motor driving control system which is capable of driving an ultrasonic motor at a stabilized circumferential rotating speed by applying a stable high frequency signal of a resonance frequency.

Furthermore, it is another object of the present invention to provide an ultrasonic motor driving control system which is able to drive the ultrasonic motor stably by applying a stable high frequency signal of a resonance frequency and to stop (to position) at a predetermined position accurately.

According to a first aspect of the present invention, there is provided a digital automatic frequency stabilizing circuit, comprising a digital/analog converter (D/A converter) which converts an outputted digital value into an analog voltage signal, a voltage/frequency converter (V/F converter) which converts the output voltage of the D/A converter into a signal having a corresponding frequency, a frequency measuring circuit which measures the output frequency from the voltage/frequency converter in every unit time, a comparator which compares the measurement result of the frequency measuring circuit with a preset frequency set value, and an up-down counter which up- or down-counts in accordance with the comparison result of the comparator, in which the count value thereof is used as the inputted digital value of above-mentioned D/A converter.

In this frequency stabilizing circuit, the V/F converter outputs a signal having a frequency corresponding to an inputted digital value which is a count value of the up-down counter. The output frequency (number of output pulses per unit time corresponding thereto) from the V/F converter is measured by the frequency measuring circuit, and the output frequency value (a value of number of output pulses per unit time) which is the result of measurement is outputted to the comparator. The comparator compares the output frequency value measured by the frequency measuring circuit with the frequency set value (a set value showing a target output frequency). The up-down counter is operated in accordance with the result of comparison with the comparator, and counts up so that the output frequency is increased so as to reach the target frequency when the output frequency value is smaller than the set value, and counts down so that the output frequency is decreased so as to reach the target frequency when the output frequency value is bigger than the set value on the contrary. By means of count operation of this up-down counter, the input digital value changes, and the output frequency from the V/F converter also changes in a direction to coincide with the set value. This new output frequency is measured by the frequency measuring circuit and used for comparison with the set value by means of the comparator, and the up-down counter counts up or counts down again based on the result of measurement. The output frequency comes to coincide with the set value by repeating the foregoing, and it becomes possible to always output a stabilized frequency even if the characteristic of the D/A converter or the V/F converter is changed by temperature change and the like.

According to this frequency stabilizing circuit, the output frequency and the set frequency value are compared with each other utilizing the combination of the D/A converter and the V/F converter, the up-down counter is controlled in accordance with the result of comparison, and the count value of the counter is inputted (input digital value) to the D/A converter. With such a construction, the input of the D/A converter is varied automatically in accordance with the value of the output frequency, and feedback control is made digitally so that the output frequency coincides with the set frequency value. Thus, the time for adjustment by an operator to set the output frequency to the set value in saved. Further, a stable frequency which coincides with the set value may be always outputted even if the characteristics of the D/A converter and the V/F converter are changed due to temperature change, aging and the like. Further, since the circuit of the present invention is not such a system that a signal of a predetermined frequency is outputted by dividing the frequency of a clock pulse, it is possible to set the frequency with fine resolution (approximately 10 to 100 Hz) even for a high frequency (several hundreds KHz).

According to a second aspect of the present invention, there is provided a control system in which a rotary encoder is coupled with an ultrasonic motor, a phase locked loop circuit which is operated based on a reference clock signal from reference clock generating means and the output pulse of above-mentioned rotary encoder is provided, and above-mentioned ultrasonic motor driver is driven and controlled by the phase locked loop circuit so that the ultrasonic motor is rotated at a constant circumferential speed.

When a clock signal which is used as reference rises, a rotation command is sent from the phase locked loop (PLL) circuit to the ultrasonic motor driver, the ultrasonic motor is excited to start to rotate, and the rotary encoder is also rotated at the same time. A pulse signal is produced by the rotation of the rotary encoder, and input of the rotation command from the PLL circuit to the ultrasonic motor driver is stopped with the rise of the pulse signal. The ultrasonic motor is brought to a standstill at a position where the encoder pulse has risen until a next rotation command arrives. Similar operation is repeated thereafter, and the ultrasonic motor is driven to rotate.

The ultrasonic motor itself is rotated at a full speed when driven, but when it is rotated up to a certain angle, it is kept waiting at that position for time adjustment. The operation of the ultrasonic motor becomes a stable continuous rotation in a time scale longer than the clock signal. Further, it is possible to obtain a proper duty corresponding to load variation promptly. Thus, the ultrasonic motor is driven to rotate at a stable circumferential speed if the clock signal which becomes a reference is stable.

According to a third aspect of the present invention, in an ultrasonic motor control apparatus which controls driving of an ultrasonic motor coupled with a rotary encoder, there is provided an improvement in construction that an ultrasonic motor driving control means which drives the ultrasonic motor in accordance with a command pulse instructing to start driving of the ultrasonic motor and stop the driving of the ultrasonic motor to a standstill in accordance with an encoder pulse from the rotary encoder which is outputted along with driving of the ultrasonic motor is provided, and the command pulse is controlled so as to drive the ultrasonic motor stepwise.

With such a construction, suspension of driving an ultrasonic motor is controlled by utilizing an encoder pulse from a rotary encoder. Thus, it is possible to drive the ultrasonic motor stepwise by controlling the command pulses, and also to use the ultrasonic motor as a stepping motor. Namely, the ultrasonic motor starts to rotate in accordance with a command pulse, and stops its rotation in accordance with a pulse from the rotary encoder coupled with the ultrasonic motor, thereby enabling it to have the ultrasonic motor driven stepwise in a similar manner as a stepping motor with high accuracy only through the control of the command pulses.

BRIEF DESCRIPTION OF THE DRAWINGS

FIGS. 5(a)-5(f) show a timing chart for explaining the operation of the circuit shown in FIG. 4;

FIG. 6 is a block diagram showing a loop of rotational position control extracted from the ultrasonic motor rotation control system;

FIG. 7 is a timing chart for explaining the operation of the circuit shown in FIG. 6;

DETAILED DESCRIPTION OF THE PREFERRED EMBODIMENT

An embodiment of the present invention will be described hereinafter with reference to the drawings.

Figure 1:
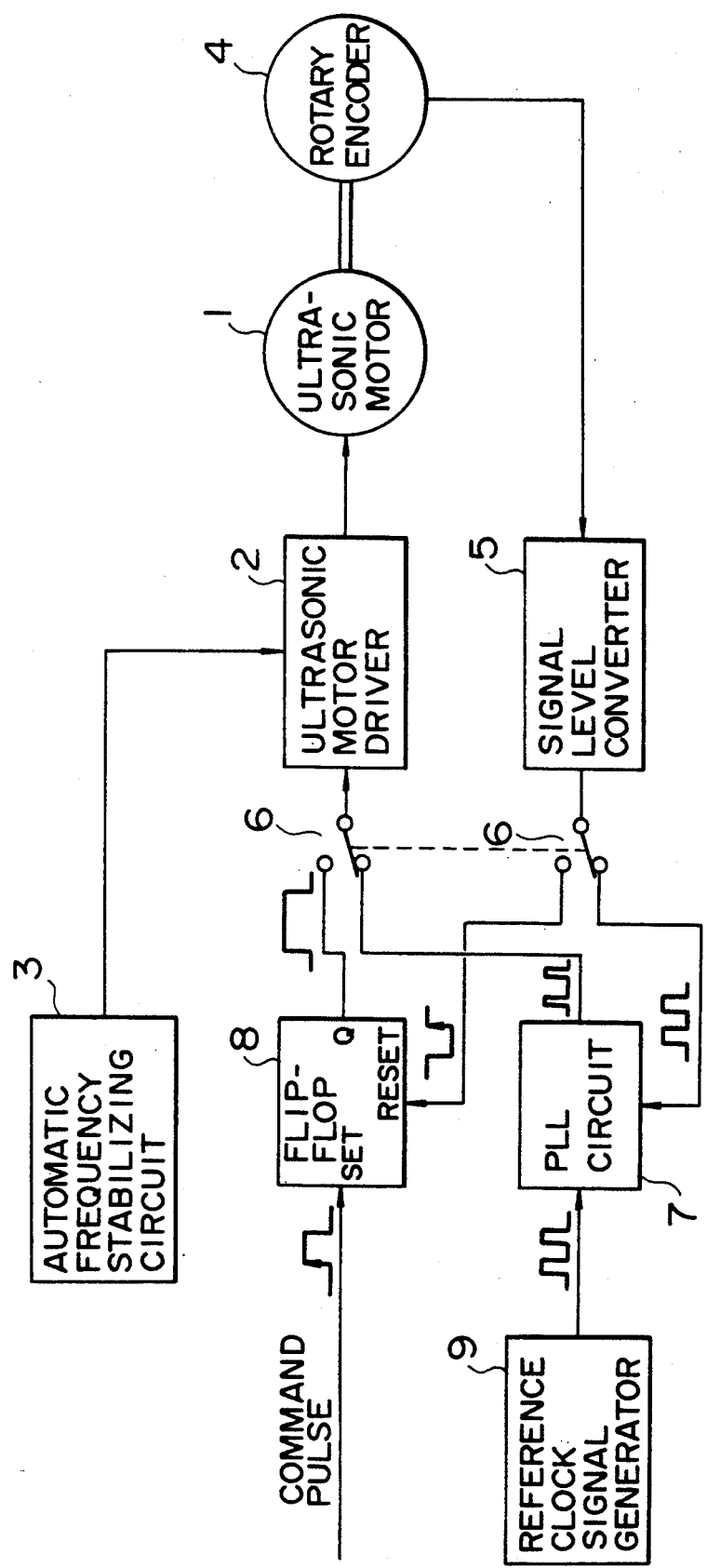
FIG. 1 is a general diagram showing the whole framework of an ultrasonic motor rotation control system as one embodiment of the present invention.

FIG. 1 shows an example in which a control system of the present invention is applied to a welding apparatus of a sleeve in a thin tube (see FIG. 8) or an inspection apparatus of a weld bead of a welded sleeve.

In FIG. 1, an ultrasonic motor 1 is applied with a driving voltage required for driving thereof from an ultrasonic motor driver 2. An AC signal having a stable frequency is applied to the ultrasonic motor driver 2 from an automatic frequency stabilizing circuit 3.

Furthermore, an output shaft of the ultrasonic motor 1 is provided with a rotary encoder 4. Namely, the rotary encoder 2 is rotated in accordance with rotation of the ultrasonic motor 1, producing a pulse signal representing an angular displacement of the shaft. The level of this pulse signal is converted into that of a control circuit by means of a signal level converter 5.

In the present embodiment, it is possible to use two types of control operation through change-over by a selecting means 6 in accordance with an operation mode required for above-mentioned welding apparatus and the like.

The output from the signal level converter 5 is inputted switchably to a phase locked loop (PLL) circuit 7 in a rotation speed control loop or a flip-flop. (F/F) circuit 8 in a position control loop. Similarly, control signal from these circuits 7 and 8 are inputted to the ultrasonic motor driver through the selecting means 6.

Further, a reference clock signal generator 9 is connected with the PLL circuit 7.

In the preferred embodiment of the present invention as described above, the detail of the automatic frequency stabilizing circuit 3 of a digital type will be described first with reference to FIGS. 2 and 3.

Figure 2:
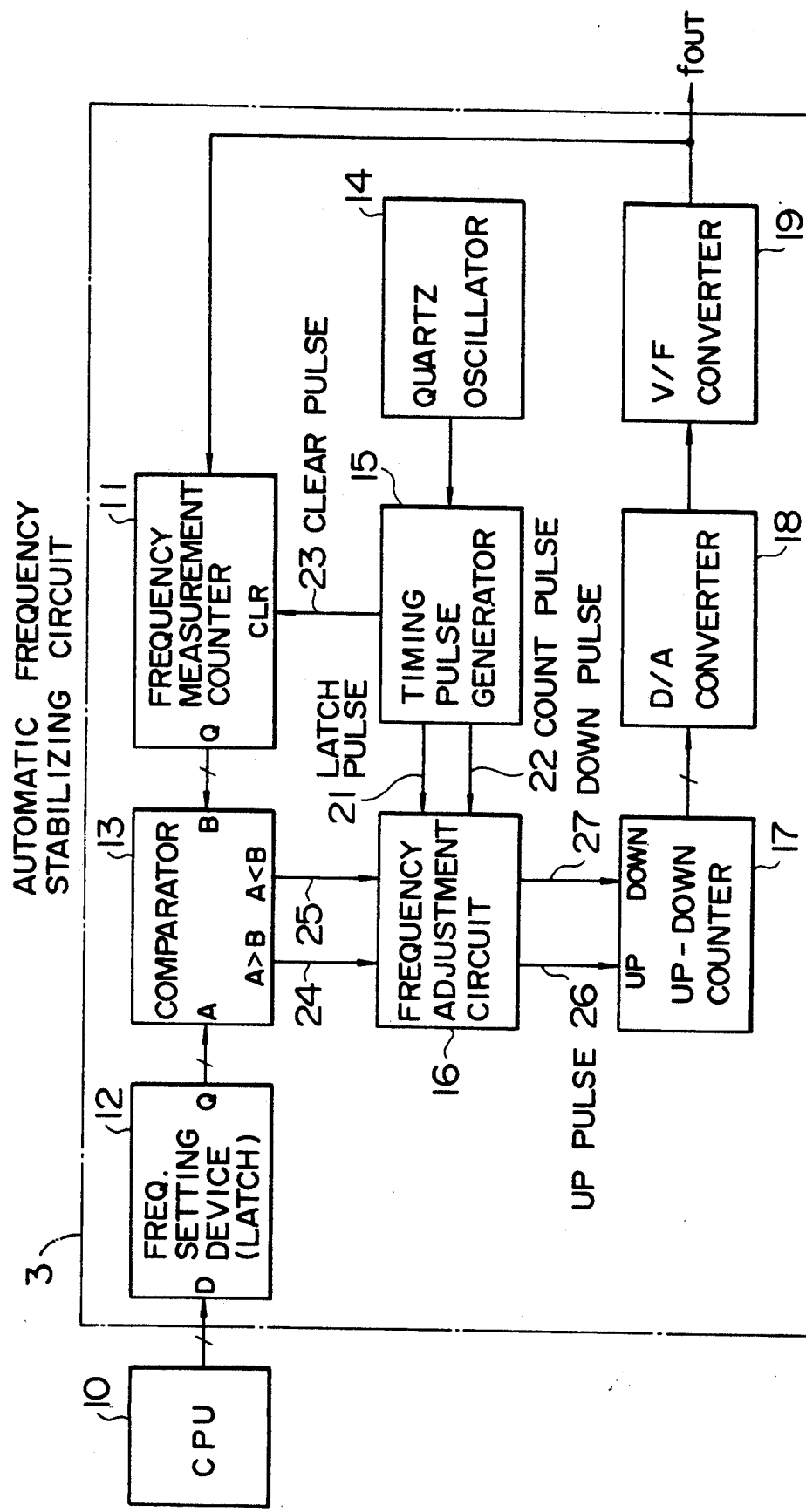
FIG. 2 is a block diagram showing an example of an automatic frequency stabilizing circuit used in the ultrasonic motor rotation control system.

FIG. 2 shows a construction of the automatic frequency stabilizing circuit 3 of a digital type which outputs a signal $f_{out}$ having a frequency set by a digital set value (frequency set value) given by a CPU 10.

The automatic frequency stabilizing circuit 3 includes a frequency measurement counter 11 for measuring the frequency (output frequency) of the signal (output frequency signal) $f_{out}$, a frequency setting device (latch) 12 for latching a frequency set value from the CPU 10, and a comparator 13 which compares a measured value of the frequency setting device 12 with a measured value (output frequency) of the frequency measurement counter 11.

The automatic frequency stabilizing circuit 3 includes further a crystal oscillator 14 which outputs a clock pulse for a timing pulse generator 15 which is described in the following, a timing pulse generator 15 which creates and outputs three types of timing pulses, viz., a latch pulse 21 required for dividing the frequency of an output pulse from the crystal oscillator 14 and measuring the output frequency accurately, a count pulse 22 and a clear pulse 23 for the frequency measurement counter 11, and a frequency adjustment circuit 16 which holds two types of comparison signals 24 and 25 showing the result of comparison by the comparator 13 by means of the latch pulse 21 from the timing pulse generator 15, obtains a logical product with the count pulse 22, and creates and outputs an up pulse 26 and a down pulse 27 required for adjustment for maintaining the output frequency stably.

The automatic frequency stabilizing circuit 3 further includes an up-down counter 17 for output frequency adjustment which counts up with the up pulse 26 from the frequency adjustment circuit 16 and counts down with the down pulse 27, a D/A converter 18 for converting a count value (digital value) of the up-down counter 17 into an analog signal (voltage signal) having a voltage value shown by the count value, and a V/F converter 19 which converts an output voltage of the D/A converter 18 into the signal $f_{out}$ having a frequency corresponding to the output voltage and outputs it.

Besides, in FIG. 2, a line added with a mark "/" shows a data transmission line.

Next, the operation of the construction shown in FIG. 2 will be described with reference to a timing chart of FIG. 3.

The up-down counter 17 counts up or counts down with the up pulse 26 or the down pulse 27 from the frequency adjustment circuit 16. The count value of the up-down counter 17 is supplied to the D/A converter 18. The D/A converter 18 outputs an analog signal (voltage signal) having a voltage value shown with the count value of the up-down counter 17 to the V/F converter 19. The V/F converter 19 creates an output signal $f_{out}$ having a frequency in proportion to the output voltage of the D/A converter 18. This signal $f_{out}$ is outputted outside as the output signal of the automatic frequency stabilizing circuit 3, and is also outputted to the frequency measurement counter 11 in the automatic frequency stabilizing circuit 3.

The frequency measurement counter 11 measures the existing frequency of the signal $f_{out}$, viz., the existing output frequency of the automatic frequency stabilizing circuit 3 by counting the number of pulses (number of output pulses) of the signal $f_{out}$ which is outputted from the V/F converter 19 for a certain period. When above-mentioned count for a certain period is made and the output frequency (number of output pulses corresponding thereto) for that period is measured, a clear pulse 23 is inputted at a clear terminal CLR to the frequency measurement counter 11 from the timing pulse generator 15. With this, the frequency measurement counter 11 is cleared, and operation of counting the number of output pulses of the signal $f_{out}$, viz., measuring operation of the frequency of the signal $f_{out}$, is performed until a clear pulse 23 is subsequently supplied. Besides, the output timing of the clear pulse 23 from the timing pulse generator 15 will be described separately.

Now, a target value (number of target output pulses corresponding thereto) of the frequency of the output signal $f_{out}$ is given to the automatic frequency stabilizing circuit 3 in advance by means of the CPU 10 as a digital frequency set value, and is set to the frequency setting device 12 in the circuit 3. The set value (frequency set value) of the frequency setting device 12 is supplied at an input terminal A to the comparator 13. An actual frequency value of the existing output signal $f_{out}$ measured by the frequency measurement counter 11, viz., the output frequency value (number of output pulses per unit time corresponding thereto) is supplied at an input terminal B to the comparator 13.

The comparator 13 compares the set value (frequency set value) of the frequency setting device 12 which is an input value A with the measured value (output frequency value) of the frequency measurement counter 11 which is an input value B, and makes a comparison signal 24 among comparison signals 24 and 25 true (logical "1") if the frequency set value is bigger than the output frequency value (A>B), and makes the comparison signal 25 true (logical "1") if the frequency set value is smaller than the output frequency value (A<B). The comparison signals 24 and 25 are supplied to the frequency adjustment circuit 16. The latch pulse 21 and the count pulse 22 are also supplied to this frequency adjustment circuit 16. These latch pulse 21 and count pulse 22 are generated and outputted from the timing pulse generator 15 by dividing the frequency of the output pulse from the crystal oscillator 14, and the count pulse 22 is outputted immediately after output of the latch pulse 21 as shown in FIG. 3. Further, the clear pulse 23 for clearing counting signal in the frequency measurement counter 11 is also generated and outputted from the timing pulse generator 15 simultaneously with the count pulse 22.

Now, the frequency adjustment circuit 16 holds two types of comparison signals 24 and 25 (logical values thereof) from the comparator 13 by the latch pulse 21 from the timing pulse generator 15, and obtains a logical product of respective held contents (logical values) and the count pulse 22 (logical value thereof) from the timing pulse generator 15. As a result, the logical product value of the comparison signal 24 which is held at the timing of the latch pulse 21 and the count pulse 22 becomes logical "1" at the timing of the count pulse 22 only when the comparison signal 24 is true (logical "1"), viz., when the frequency set value is bigger than the output frequency value (A>B), and is outputted to an up terminal UP of the up-down counter 17 as an effective up pulse 26. Similarly, the logical product of the comparison signal 25 held at the timing of the latch pulse 21 and the count pulse 22 becomes logical "1" at the timing of the count pulse 22 only when the comparison signal 25 is true (logical "1"), viz., when the frequency set value is smaller than the output frequency value (A<B), and is outputted to a down terminal (DOWN in the figure) of the up-down counter 17 as an effective down pulse 27. Incidentally, it is also possible to obtain respective logical products of the comparison signals 24 and 25 and the count pulse 22 without performing above-described holding operation, but it is preferable to do so after holding the comparison signals 24 and 25 temporarily as in the present embodiment in order to prevent malfunctions in timing.

The up-down counter 17 performs count-up operation every time the up pulse 26 is inputted from the frequency adjustment circuit 16, and applies increment to the count value. Further, the up-down counter 17 performs count-down operation every time the down pulse 27 is inputted from the frequency adjustment circuit 16, and applies decrement to the count value. When the count value of the up-down counter 17 is applied with increment, the output voltage value of the D/A converter 18 gets larger, and the frequency of the output signal $f_{out}$ from the V/F converter 19 becomes larger in proportion thereto. On the contrary, when the count value of the up-down counter 17 is applied with decrement, the output voltage value of the D/A converter 18 gets smaller, and the frequency of the output signal $f_{out}$ from the V/F converter 19 also becomes smaller in proportion thereto.

Figure 3:
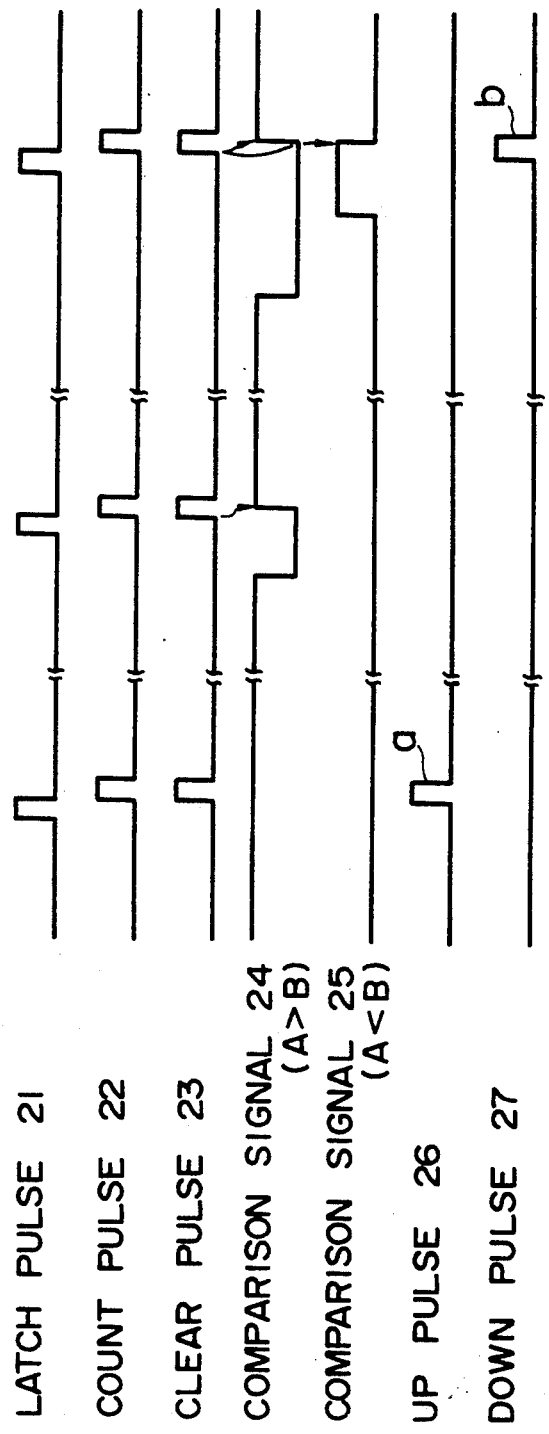
FIG. 3 is a timing chart for explaining the operation of the circuit shown in FIG. 2.

As described above, in the present embodiment, when the comparison signal held in the frequency adjustment circuit 16 at the timing of the latch pulse 21 is true (logical "1"), viz., when the frequency of the output signal $f_{out}$ is smaller than the frequency set value (target frequency value), and the up pulse 26 is outputted as shown at a mark a in FIG. 3 at the timing of the count pulse 22 and the up-down counter 17 is counted up, thus performing adjustment of increment of the frequency of the output signal $f_{out}$. The result of such frequency adjustment is measured again by means of the frequency measurement counter 11 and supplied to the comparator 13, where comparison with the frequency set value is carried out again. Further, when the output frequency is smaller than the frequency set value even after above-described adjustment, the up-down counter 17 does count-up operation again, and the frequency of the signal $f_{out}$ is increased.

When above-described frequency adjustment is repeated and the output frequency comes to coincide with the frequency set value, both comparison signals 24 and 25 from the comparator 13 become false (logical "0"). In case the comparison signals 24 and 25 are false, neither the up pulse 26 nor the down pulse 27 is outputted from the frequency adjustment circuit 16. In this case, normally the signal $f_{out}$ having a frequency which coincides with the set frequency is outputted stably from the V/F converter 19. However, if the characteristic of the D/A converter 18 or the V/F converter 19 is changed due to temperature change, aging and the like, the frequency of the signal $f_{out}$ shifts from the set frequency. If the frequency of the signal $f_{out}$ becomes larger than the set value, the comparison signal 25 becomes true (logical "1") and the down pulse 27 is outputted from the frequency adjustment circuit 16 at the timing of the count pulse 22 as shown at a mark b in FIG. 3, thus performing decrement adjustment of the frequency of the output signal $f_{out}$ as described previously. The result of such frequency adjustment is measured by the frequency measurement counter 11 and supplied to the comparator 13, where comparison with the set value is made again. Further, in case the output frequency is larger than the set value even after above-mentioned adjustment, the up-down counter 17 makes count-down operation again and the frequency of the signal $f_{out}$ is lowered, thus making feedback control for having the output frequency coincide with the set value.

The output signal $f_{out}$ gained in the above-mentioned manner is used to excite an ultrasonic motor driver 2 as hereinlater described when a control command signal is inputted thereto.

Next, a rotation speed control for an ultrasonic motor with a phase locked loop (PLL) circuit 7 according to the present invention will be described with reference to FIGS. 4 and 5.

Figure 4:
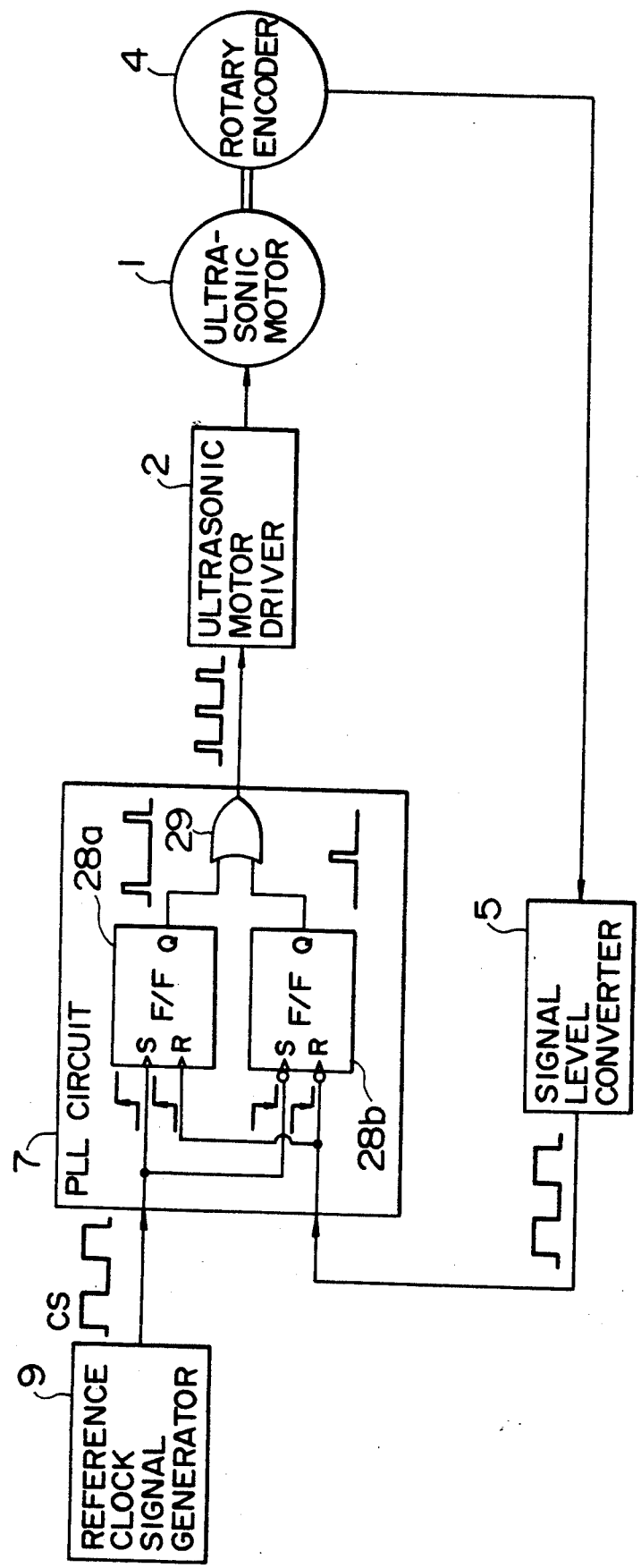
FIG. 4 is a block diagram showing a loop of a rotation speed control extracted from the ultrasonic motor rotation control system according to the present invention.

FIG. 4 shows a state that the change-over means 6 has been switched over to the side of the PLL circuit 7 in the embodiment shown in FIG. 1, and those parts that are not required for description hereinafter are omitted.

In FIG. 4, a reference clock signal generator 9 which generates a clock signal CS which is used as reference for stipulating the motor speed uses a crystal oscillator in order to increase stability of the motor speed and divides the frequency of the oscillation output thereof so as to produce the clock signal CS. The frequency of the clock signal CS generated in the reference clock signal generator 9 is set arbitrarily by instructions from a computer (not shown). The clock signal CS which is outputted from the reference clock signal generator 9 is transmitted to a PLL circuit 7.

The PLL circuit 7 is composed of two sets of flip-flop (F/F) circuits 28a and 28b and an OR circuit 29, and above-mentioned clock signal CS is inputted to set terminals S of the flip-flop circuits 28a and 28b. Further, a pulse signal which is outputted from a signal level converter 5 is inputted to reset terminals R of the flip-flop circuits 28a and 28b. The flip-flop circuit 28a is set with the rise of the clock signal CS, and is reset with the rise of a pulse signal from the signal level converter 5. The flip-flop circuit 28b is set with the fall of the clock signal CS, and is reset with the fall of the pulse signal from the signal level converter 5. Then, output signals of above-mentioned flip-flop circuits 28a and 28b are transmitted to an ultrasonic motor driver 2 as a control command through the OR circuit 29.

The ultrasonic motor driver 2, receiving an output signal $f_{out}$ as mentioned above, applies driving voltages to an ultrasonic motor 1 only for a period of time when the control signal from the PLL circuit 7 is at a high level. A rotary encoder 4 is coupled to an output shaft of the ultrasonic motor 1. This rotary encoder 4 generates a pulse signal in proportion to an angular displacement of an output shaft of the ultrasonic motor 1. The signal level of the pulse signal which is outputted from the rotary encoder 4 is converted in the signal level converter 5, and transmitted to the PLL circuit 7 as a reset signal as described above.

Next, the operation of the rotation speed control will be described with reference to FIG. 5. FIGS. 5 (a) to (e) are time charts showing signal waveforms of respective parts shown in FIG. 4, in which FIG. 5 (a) shows a clock signal CS, FIG. 5 (b) shows an encoder pulse signal (output signal of the rotary encoder 4), FIG. 5 (c) shows an output signal of the flip-flop circuit 28a, FIG. 5 (d) shows an output signal of the flip-flop circuit 28b, and FIG. 5 (e) shows an output signal of the PLL circuit 7. Further, FIG. 5 (f) is a graph showing a rotating state of the ultrasonic motor 1 with time [micro sec] shown along the axis of abscissa and with rotation angle [deg.] along the axis of ordinate, wherein a mark A shows an actual movement (speed) when the ultrasonic motor 1 is rotated under PLL control, and a mark B shows a target speed curve, e.g., a curve when the rotary encoder 4 of 240 P/R (pulse per revolution) is rotated at 12.5 rpm.

The clock signal CS from the reference clock signal generator 9 is supplied to the PLL circuit 7. At this time, in the reference clock signal generator 9, it is set so that a clock signal CS has the frequency same as the frequency of an encoder pulse signal obtained when the ultrasonic motor 1 is rotated at a desired rotating speed.

When the clock signal CS which is used as reference rises, the flip-flop circuit 28a in the PLL circuit 7 is set, and a rotation command is transmitted to the ultrasonic motor driver 2 which in turn receives a frequency signal as described above. With this, the ultrasonic motor driver 2 starts to work, the ultrasonic motor 1 is energized to rotate, and the rotary encoder 4 is also rotated at the same time. The encoder pulse signal is outputted by the rotation of this rotary encoder 4, the flip-flop circuit 28a is reset with the rise of the encoder pulse signal, and the rotation command to the ultrasonic motor driver 2 is cut. Since the ultrasonic motor 1 shows no inertial movement, a rotor thereof stays at the position where the pulse signal from the encoder has risen until a next rotation command comes.

Thereafter, when above-mentioned clock signal CS falls, the flip-flop circuit 28b in PLL circuit 7 is set again, and a new rotation command is transmitted to the ultrasonic motor driver 2. The ultrasonic motor 1 is rotated by this command, and the rotary encoder 4 rotates together. With the rotational displacement of the rotary encoder 4, the encoder pulse signal which has been outputted till then falls. When this encoder pulse signal falls, the flip-flop circuit 28b is reset, and the rotation command to the ultrasonic motor driver 2 is cut off. As a result, the ultrasonic motor 1 stays at the position where the encoder pulse signal falls until a next rotation command is received.

Similar sequential operation is repeated hereafter, the ultrasonic motor 1 is driven to rotate smoothly in succession viewed in a longer time scale, though intermittently in reality. The ultrasonic motor 1 itself rotates at a full speed when driven, but it comes to a standstill until a next clock signal CS changes after it rotated to a certain angular position as shown in FIG. 5 (f), viz., when it rotated by an angle which is a half of resolution of the rotary encoder 4. Hence, the ultrasonic motor 1 rotates by a certain angle only within a certain period of time.

Figure 5F:
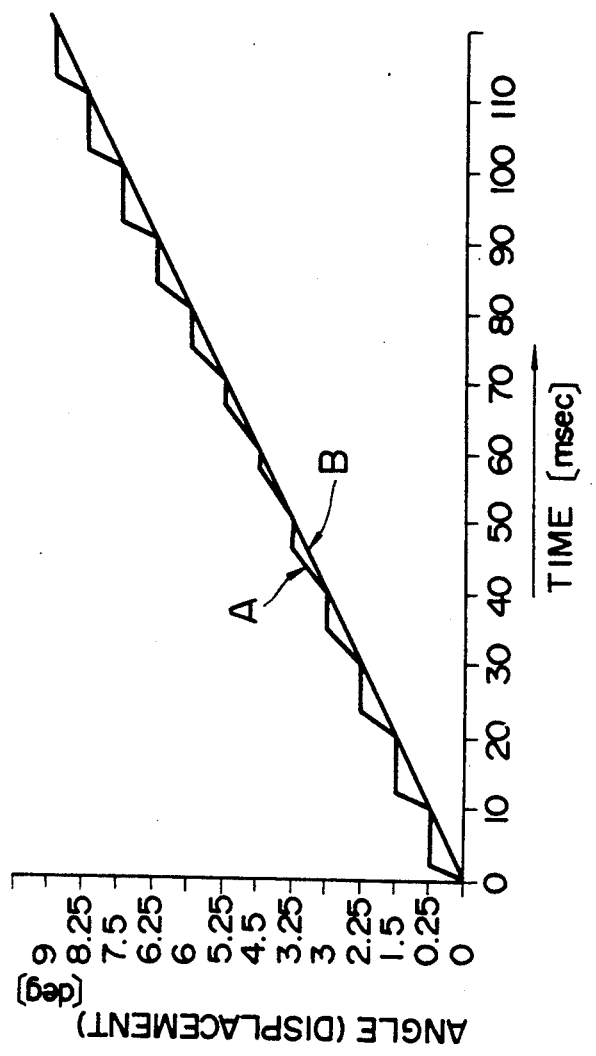

Accordingly the rotating position of the ultrasonic motor 1 always falls on the target speed curve B shown in FIG. 5 (f), and rotates at a stabilized speed in a longer time scale as compared with the clock signal. Furthermore, only the ON time of the motor is changed (duty is changed) and a moving distance (angle) is not changed even if the load fluctuates. Therefore, stability of the speed remains unchanged. Namely, since the clock signal CS which is used as reference can be kept stable, the ultrasonic motor 1 rotates at a stable speed. Although the movement of the ultrasonic motor 1 itself comes to a standstill every time it rotates by a certain angle, it looks like rotating smoothly in succession visually since the resolution of the encoder 4 is sufficiently high. Further, as shown in above-described embodiment, a crystal oscillator is used in the reference clock signal generator 9 and the output pulse is produced by frequency division. Thereby, it is not required for an operator to adjust the frequency and there is no unevenness for each apparatus, thus making it possible to set a very accurate and stable speed.

Next, details of a rotational position control according to the present invention will be described with reference to FIGS. 6 and 7. Besides, FIG. 6 shows a state that the change-over means 6 in FIG. 1 has been switched over to the flip-flop circuit 8. Here, those parts that are not required for description hereinafter are omitted.

In FIG. 6, a simbol character 8 denotes a flip-flop circuit. The flip-flop circuit 8 receives a command pulse (SET in the Figure), and is put ON at the rise of the command pulse and outputs a driving signal. This driving signal is put OFF at the rise of an encoder pulse from a rotary encoder 4 as described later. The ultrasonic motor driver 2 which receives the output signal $f_{out}$ described above from the automatic frequency stabilizing circuit 3 is connected with an output terminal (Q in the Figure) of the flip-flop circuit 8. The ultrasonic motor driver 2 applies driving voltages to the ultrasonic motor 1 which is the object of control while the driving signal from the flip-flop circuit 8 is in an ON state. The ultrasonic motor 1 is energized to rotate in accordance with the driving voltages from the ultrasonic motor driver 2. Since the ultrasonic motor 1 shows no inertial movement, the rotation is brought to a standstill with very high accuracy depending on the degree of the driving voltage. Further, the rotary encoder 4 is coupled with an output shaft of the ultrasonic motor 1. The rotary encoder 4 rotates in keeping with rotation of the ultrasonic motor 1, and outputs a pulse signal. The signal level converter 5 which converts an encoder pulse signal into a signal level of the control circuit is connected with the rotary encoder 4. The output terminal of the signal level converter 5 is connected with a reset terminal (RESET in the Figure) of the flip-flop circuit 8, and an encoder pulse which has been converted into a predetermined level is inputted thereto.

Next, the operation of rotational position control will be described.

FIG. 7 shows timing charts showing timings of a command pulse which is inputted to the flip-flop circuit 8, a motor driving pulse which is inputted to the ultrasonic motor driver 2 from the flip-flop circuit 8, and an encoder pulse which is outputted from the rotary encoder 4.

First, when the ultrasonic motor 1 is driven to rotate, the command pulse is applied to the flip-flop circuit 8. The flip-flop circuit 8 is brought into an ON state in accordance with the rise of the command pulse, and outputs the driving signal to the ultrasonic motor driver 2. The ultrasonic motor driver 2 applies the driving voltage to the ultrasonic motor 1 in accordance with the driving signal. The ultrasonic motor 1 is driven to rotate by the driving voltages. Namely, the ultrasonic motor 1 starts to rotate in accordance with the rise of the command pulse.

When the ultrasonic motor 1 rotates, the rotary encoder 4 rotates in keeping with this rotation and outputs the encoder pulse. The encoder pulse which has been outputted from the rotary encoder 4 is converted into a predetermined signal level by the level converter 5 and inputted to the reset terminal of the flip-flop circuit 8.

The flip-flop circuit 8 is brought into an OFF state at the rise of the encoder pulse as shown in FIG. 7. Namely, driving for rotation of the ultrasonic motor is sustained. Due to the fact that the ultrasonic motor 1 has no inertia and has excellent suspension accuracy, it rotates with the angle for one pulse portion of the rotary encoder 4 coupled with the ultrasonic motor 1 as the step angle.

In such a manner, the ultrasonic motor 1 starts rotation in accordance with the rise of the command pulse, and stops rotation in accordance with the rise of the encoder pulse. In other words, it becomes possible to have the ultrasonic motor 1 rotate with high accuracy by the distance (angle) corresponding to the number of command pulses applied. This means that positioning by means of the ultrasonic motor 1 is possible only by controlling the number of pulses, similarly to a stepping motor.

In such a manner, it is possible to drive stepwise by suspending the rotation of the ultrasonic motor 1 utilizing pulses from the rotary encoder 4 coupled with the ultrasonic motor 1. Thus, it is possible to perform positioning of rotation of the ultrasonic motor 1 with high accuracy and easily only by controlling the number of command pulses. Further, processing burden with a computer may be reduced, thus improving the capacity of the whole system.

Incidentally, an example in which the ultrasonic motor 1 is used as a stepping motor has been shown in above-described embodiment, but the present invention is also applicable to an apparatus for driving the ultrasonic motor 1 to control at a constant speed.

As described above, according to above-described embodiment of the present invention, the input of the D/A converter is altered automatically in accordance with the value of the output frequency, and feedback control is made digitally so that the output frequency coincides with the set frequency value. Accordingly, the time required for an operator to adjust the output frequency so as to set the output frequency to a set value is saved, and a stabilized frequency which coincides with the set value may always be outputted even if the characteristics of a D/A converter or a V/F converter are changed due to temperature change, aging and the like. Further, since the circuit of the present invention is not of such a system that a signal having a predetermined frequency is outputted by dividing the frequency of a clock pulse, it is possible to set the frequency with high resolution (10 to 100 Hz) even for a high frequency (several hundreds KHz).

Further, the ultrasonic motor is controlled to be driven by PLL control by switching over the change-over means 6 to the PLL circuit 7. Therefore, the duty changes promptly in accordance with load variation, thus making it possible to control the rotation speed of the motor at a stable speed even if load variation is generated.

Furthermore, it becomes possible to drive the ultrasonic motor stepwise with high accuracy similarly to a stepping motor only by controlling command pulses by switching over the change-over means to the driving control circuit 8 utilizing a flip-flop.

Figure 8:
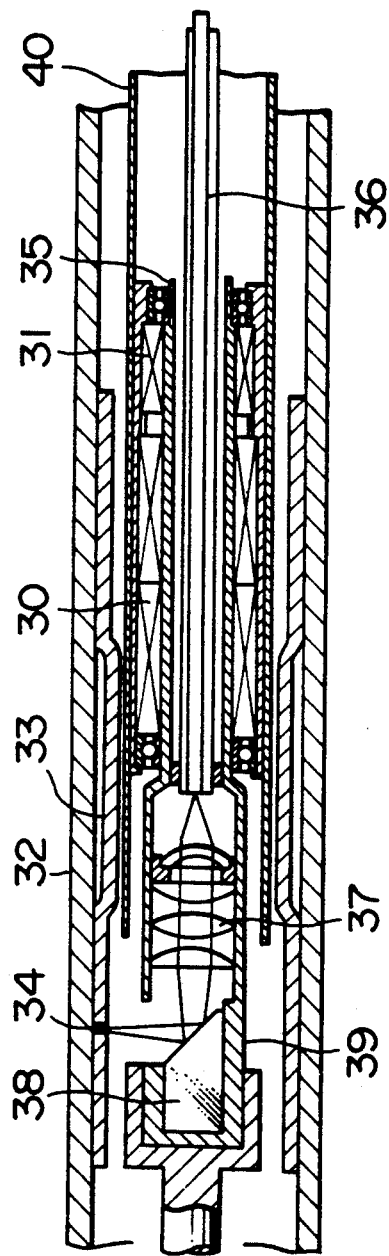
FIG. 8 is a partial sectional view of a welding apparatus for inner circumference of a thin tube utilizing an ultrasonic motor to which this invention is applicable.
Figure 9:
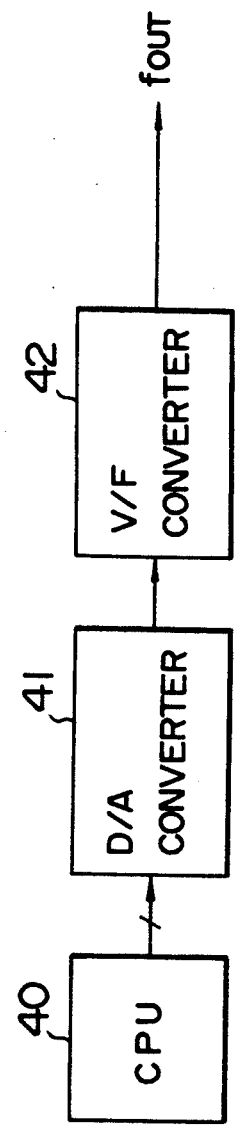
FIG. 9 is a block diagram showing a conventional control system utilized for driving an ultrasonic motor.

FIG. 8 shows an exemplification of an apparatus for welding a sleeve in a thin tube for which a control system of the present invention can be utilized. In FIG. 8, a numeral 30 indicates an ultrasonic motor, and 31 indicates an encoder directly coupled with an output shaft of the ultrasonic motor. A sleeve 33 is welded at a welding point 34 in a capillary 32 of a vapor generator. A laser beam and the like supplied through an optical fiber cable 36 in a hollow shaft 35 are used as a heat source for welding. The laser beam is converged at the welding point 34 after being reflected by a mirror 38. 39 indicates a lens case, and 40 indicates a tool casing. Being driven by the ultrasonic motor 30, the welding point 34 rotates along an inner circumference of the capillary 32, and the sleeve 33 is welded to the capillary 32.

I claim

1. A control system for a progressive wave type ultrasonic motor, comprising:

an ultrasonic motor driver circuit which supplies driving electric power to an ultrasonic motor;

a rotary encoder which is coupled with an output shaft of the ultrasonic motor, and generates a pulse signal in accordance with rotation of the ultrasonic motor;

a reference clock signal generator which generates a clock signal;

a phase locked loop circuit which transmits a control signal to the ultrasonic motor driver circuit based on the clock signal and a pulse signal from the rotary encoder; and an automatic frequency stabilizing circuit for inputting a predetermined high frequency signal to the ultrasonic motor driver, said automatic frequency stabilizing circuit comprising:

an analog-to-digital converter which converts an inputted digital value into an analog voltage signal;

a voltage-to-frequency converter which converts an output voltage of the analog-to-digital converter into a frequency;

a frequency measuring circuit which measures an output frequency from the voltage-to-frequency converter at every unit time;

a comparator which compares the result of measurement of the frequency measuring circuit with a preset frequency set value; and an up-down counter which up-counts or down-counts in accordance with the result of comparison with the comparator;

and said automatic frequency stabilizing circuit controlling said up-down counter so that the frequency of the output signal coincides with said output frequency set value by using the count value of the up-down counter as an input digital value to said analog-to-digital converter;

wherein the speed of the ultrasonic motor is controlled.

2. A control system according to claim 1, wherein said phase locked loop circuit includes two sets of flip-flop circuits and an OR circuit.

3. A control system for a progressive wave type ultrasonic motor comprising:

an ultrasonic motor driver circuit which supplies driving electric power to an ultrasonic motor;

a rotary encoder which is coupled with an output shaft of the ultrasonic motor, and generates a pulse signal in accordance with rotation of the ultrasonic motor;

a driving control means which transmits a driving signal to the ultrasonic motor driver in accordance with a command pulse which instructs to start driving of the ultrasonic motor and transmits a suspension signal to the ultrasonic motor driver in accordance with a pulse signal from the rotary encoder; and an automatic frequency stabilizing circuit for inputting a predetermined high frequency signal to the ultrasonic motor driver circuit;

said automatic frequency stabilizing circuit comprising:

an analog-to-digital converter which converts an inputted digital value into an analog voltage signal;

a voltage-to-frequency converter which converts an output voltage of the analog-to-digital converter into a frequency;

a frequency measuring circuit which measures an output frequency from the voltage-to-frequency converter at every unit time;

a comparator which compares the result of measurement of the frequency circuit with a preset frequency set value; and an up-down counter which up-counts or down-counts in accordance with the result of comparison with the comparator;

and said automatic frequency stabilizing circuit controlling said up-down counter so that the frequency of the output signal coincides with a said output frequency set value by using the count value of the up-down counter as an input digital value to said analog-to-digital converter;

wherein the ultrasonic motor is driven intermittently.

4. A control apparatus according to claim 3, wherein said driving control means is composed of a flip-flop circuit.

* * * * *